FIG. I

INVENTOR
SAMUEL LUBKIN
BY S.C. Yuter
ATTORNEY

March 19, 1957  S. LUBKIN  2,786,136

PULSE COMPARATOR

Filed July 30, 1952  3 Sheets-Sheet 2

STANDARD MASK 34'

INVENTOR
SAMUEL LUBKIN
BY S. C. Yuter
ATTORNEY.

INVENTOR
SAMUEL LUBKIN
BY S. C. Yuter
ATTORNEY

United States Patent Office 2,786,136
Patented Mar. 19, 1957

2,786,136

PULSE COMPARATOR

Samuel Lubkin, Brooklyn, N. Y., assignor, by mesne assignments, to Underwood Corporation, New York, N. Y., a corporation of Delaware Application July 30, 1952, Serial No. 301,751

7 Claims. (Cl. 250—27)

This invention relates to pulse monitoring systems and more particularly to a comparator suitable for comparing an examined pulse with a standard pulse of proper shape, magnitude, and position.

In the operation of electronic devices utilizing pulse type signals, such as high speed digital computers, it is important that the shape, amplitude, and the relative position of the pulses in the system be maintained substantially constant in order to prevent defective operation.

One of the major causes of pulse deviation is alteration in the electrical characteristics of circuit components due to aging. This is particularly true in the case of vacuum tubes. Although the design of most electronic devices utilizing pulse type signals is such that minor pulse deviations do not affect circuit performance, any major variation in pulse shape, amplitude, or position will result in defective operation.

To prevent improper operation due to advanced deterioration of the pulses, it is desirable that various points in the circuitry be examined or monitored in order to detect the earlier stages of pulse deviation.

An essential of any pulse monitoring system is a provision for pulse examining. This may be accomplished by manually observing the pulse at a desired point in the circuitry using a suitable probe and oscilloscope. However, this procedure is relatively slow and requires highly skilled personnel. Additionally, manual pulse examination during the operation of the electronic device may be inconvenient, and may affect proper circuit functioning.

An object of the present invention, therefore, is to provide improved apparatus for automatically and conveniently comparing an examined pulse with a standard pulse in order to detect deviations in shape, amplitude, and position.

Another object of the invention is to provide pulse examination apparatus which recognizes the legitimate absence of a pulse.

A further object of the invention is to accurately indicate a pulse deviation at an examined point in an electronic device notwithstanding the presence of random noise.

A still further object of the present invention is to provide apparatus of relatively low cost for automatically examining a pulse for deviations of shape, magnitude, and position.

The invention will be described in connection with a pulse monitoring system of the type described and claimed in my co-pending application Serial No. 300,383, filed July 23, 1952, and assigned to the same assignee, now Patent No. 2,756,409 of July 24, 1956. The above system, which is particularly adaptable to the requirements of an electronic digital computer, automatically functions to locate the exact point at which potentially dangerous pulse deviations occur before circuit failure results; the detection taking place during the normal operation of the computer.

In accordance with my invention, the examined pulse is matched with a standard pulse of a given shape generated by a standard pulse generator. When the instantaneous magnitude of the examined pulse falls below the instantaneous magnitude of the standard pulse, the comparator produces an error indication pulse.

A feature of the invention is a lower threshold detection device which prevents the production of an error indication when the signal at the examined point is less than a given value corresponding to the random noise level.

Other objects, features and advantages will appear in the subsequent detailed description which is accompanied by drawings wherein.

Description of system

Figure 1:
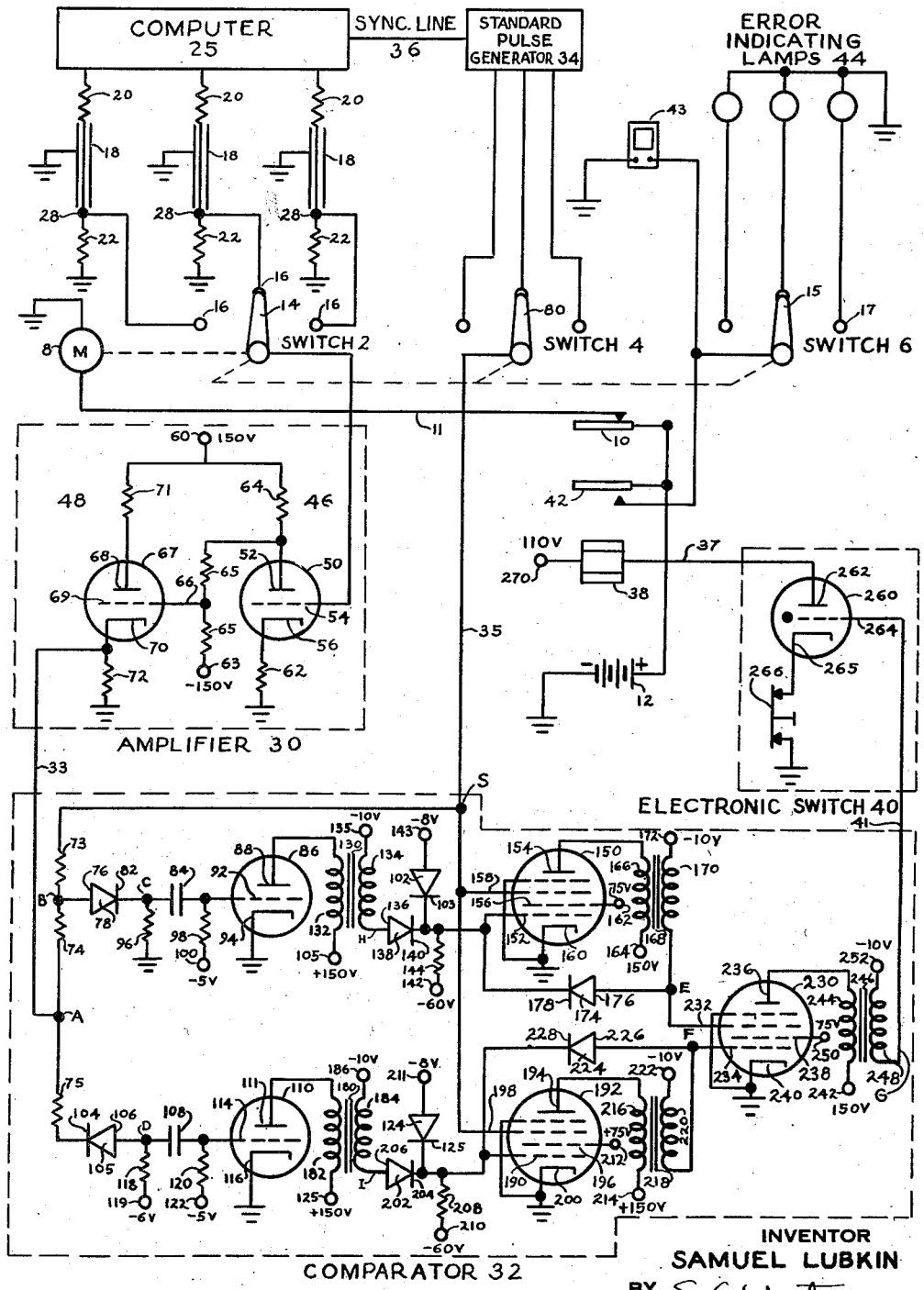
Figure 1 is a diagrammatic illustration of an electronic digital computer system embodying the invention.

Referring to the system shown in Figure 1, a rotary selector switch assemblage comprising the ganged switches 2, 4 and 6 is automatically operated by the motor or switch drive 8 which is coupled to the normally closed relay contacts 10 by connection 11. The contacts 10 are connected to the positive terminal of power supply 12. The selector switch assemblage may be of the solenoid operated or commutator types.

The ganged switches are identical and operate in unison. Switch 2 includes the rotating member 14 which makes sequential contact with the posts 16. Each of the posts 16 of the switch 2 is connected by a coaxial cable 18 to a point to be examined in the circuitry of the computer 25. The coaxial cable 18 is coupled to the examined point by means of the resistor 20 which is mounted in close proximity to the examined point. (For purposes of description, only three examined points are shown. In actual operation many more positions are provided for.) The coaxial cable 18 is terminated by the resistor 22 connected between the cable and ground. The post 16 is coupled to the junction 28 between the resistor 22 and the coaxial cable 18. The outer conductor of the coaxial cable 18 is grounded.

The points to be examined are sequentially connected by means of the switch 2 to the amplifier 30, which, in turn, is connected to one input of the comparator 32. A standard pulse generator 34 is coupled to a second input of the comparator 32 through the switch 4. The generator 34 is connected to the computer 25 by the synchronizing line 36. Pulse generators are well known in the art and are available commercially. A suitable pulse generator is the General Radio Type 869–A described in the General Radio Catalog M, October 1951, pages 155 and 156, published in Cambridge, Massachusetts.

The output of the comparator 32 is connected via output connection 41 to the electronic switch 40 which, in turn, is connected to relay 38 by connection 37. The normally open contacts 42 of relay 38 join the power supply 12 directly to the buzzer or alarm 43, and via the switch 6 to the error indicating lamps 44, the remaining terminals of the alarm and lamps being connected to ground. Each lamp 44 is associated with a particular examined point of the computer 25 because of the coordinated operation of the switches 2 and 6.

The detailed structure and operation of the amplifier 30, comparator 32 and electronic switch 40 will be described more fully below after an explanation of the operation of the pulse monitoring system.

Operation of system

Figure 4:
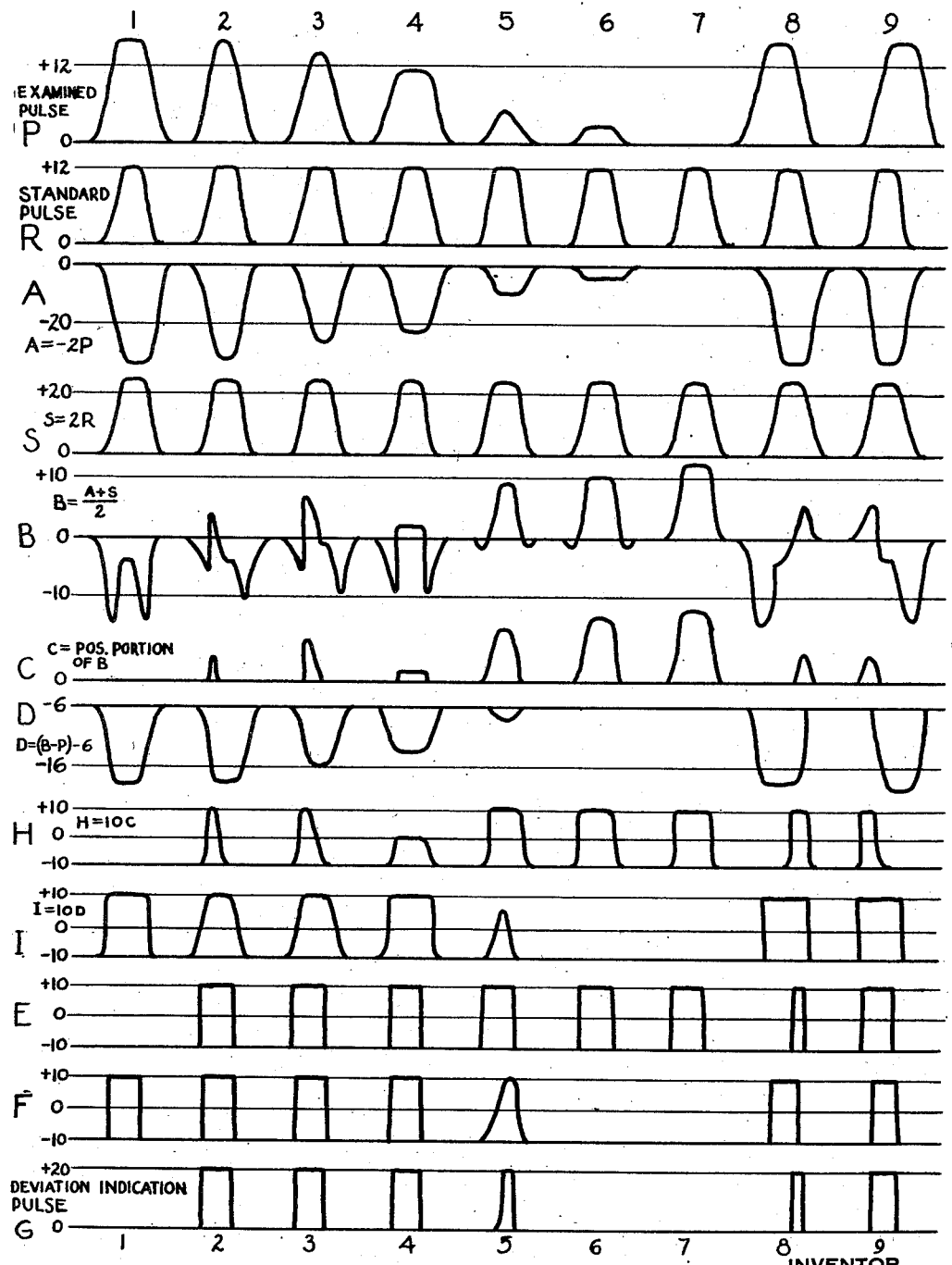
Figure 4 is a graph showing typical pulse wave forms which may occur during the operation of the systems illustrated in Figures 1 and 2.

Referring to line P of Figure 4, typical pulse shapes which may occur in the computer circuitry and which are to be examined, are shown as pulses P1 to P9.

Let it be assumed, for purposes of example, that a pulse amplitude greater than twelve volts is necessary for assuring proper operation of the computer circuitry at a particular point, and that pulse P1 of an amplitude of sixteen volts is a pulse of excellent amplitude and shape.

Pulse P2 illustrates the change in shape which may occur as the constants of the circuit components change. The pulse magnitude is still sixteen volts, but the pulse is more rounded and the rise and fall times (the periods between minimum and maximum amplitude) have increased. The computer circuits are designed so that the pulse shape deviation indicated by pulse P2 will not result in error production; however, it is advantageous to know of this condition in order to prevent further deterioration.

Other changes in the constants of the circuitry may produce a pulse shape similar to that indicated as pulse P3. The magnitude of pulse P3 is greater than twelve volts and will result in proper circuit operation, but the shape deterioration has reached a dangerous state and it is desirable to avoid any further deviation in order to prevent the future production of erroneous results.

Pulse P4, with an amplitude slightly less than twelve volts, although of good shape is of too low a magnitude and slight further deterioration will result in improper operation of the computer.

Pulse P5, with an amplitude only slightly greater than three volts will result in improper operation of the computer.

The invention will normally detect deterioration long before any pulse falls to the level of pulse P5. However, certain abrupt types of circuit defects may result in sudden change from a good pulse to one of this type. Such a pulse may also be encountered without detection of previous deterioration when defective computer components are replaced by components which have characteristics which do not meet the requirements of the circuit.

Pulse P6, with an amplitude of less than three volts, will be utilized to explain the operation of the invention in the presence of random noise.

The position P7 is used to illustrate the operation of the invention in the case of the legitimate absence of a pulse at the examined point.

Pulse P8 is an otherwise acceptable pulse which is displaced in time position since it occurs too early.

Pulse P9, which is also properly shaped and of sufficient amplitude, is displaced in time position since it occurs too late.

As will be explained in more detail hereinafter, the invention functions to detect the marginal but acceptable pulses P2, P3 and P4 before their shapes or magnitudes deteriorate further and cause computer error. The invention also operates to detect pulses of unacceptable magnitude of the P5 type and displaced pulses of the P8 and P9 types. Further, this detection occurs coincident with the normal operation of the computer, and the system indicates the exact location of the undesirable circuit component variations. However, a pulse deviation is not indicated in the presence of random noise or when a pulse is legitimately absent.

Referring again to the system shown in Figure 1, the resistor 20 serves to provide a high impedance connection to the examined point in order to minimize computer circuit disturbance and is chosen to be of relatively high resistance. Resistor 22 is chosen to equal the characteristic impedance of the coaxial cable 18 in order to terminate the cable properly.

This choice of components results in a high impedance connection between the computer and the rest of the pulse monitoring system such that the attenuation is substantially independent of frequency. Thus, the detected signal is made proportional to the original examined pulse in amplitude and similar to it in shape. If the examined pulses vary considerably in amplitude from point to point in the circuitry, the resistance of the resistors 20 may be chosen so that all signals are reduced to susbtantially the same comparison level.

Due to the attenuation introduced by the high impedance coupling to the computer, it is necessary to amplify the signal before examination. This is the function of amplifier 30, which is operated as a linear amplifier in order to produce an output signal proportional to the input signal. The examined pulse (which will be used hereafter in place of the signal representing the examined pulse) is compared with an amplified standard pulse of a selected wave shape and twice the amplitude of a satisfactory computer pulse R, the amplified standard pulse S being produced by the standard pulse generator 34. Synchronizing line 36 functions to synchronize the standard and examined pulses to assure accurate time coincidence of signals. There is also provision for a number of different types of standard pulses depending on the desired shape of the pulses at the examined points in the computer circuitry. Normally, a given standard pulse is used to check a number of different points since desired pulse shapes and amplitudes are the same in many circuits of the computer.

The comparator 32 functions to examine the pulse in two different ways. Firstly, it determines whether the examined pulse is less at any moment than a given standard or limiting pulse (line R of Figure 4). Secondly, it determines whether the examined pulse is greater than a specified noise level, for example, three volts.

If both conditions exist simultaneously during the operation of the computer then the comparator produces an output pulse which operates the electronic switch 40 causing the relay 38 to energize signifying a dangerous pulse deviation (pulses P2 to P5, P8 and P9).

If the examined pulse is less than three volts then no output pulse will be produced. This is the situation in the case of the legitimate absence of a pulse at the examined point (position 7). Similarly, random noise does not affect the operation of the system since the noise magnitude is normally less than three volts (pulse 6). Of course, if a pulse is properly positioned and is of acceptable shape and magnitude, then no output pulse is produced (pulse P1).

When the relay 38 is energized, contacts 10 open and contacts 42 close. The opening of contacts 10 removes the power from the switch drive 8 stopping the switch member 14 at a position corresponding to the point in the computer where the danger exists. At the same time, the closing of contacts 42 energizes the alarm 43 and lights the appropriate error indicating lamps 44. Of course, instead of stopping the switch at a position corresponding to a defective point in the computer an annunciator may be operated without interfering with the continuity of the scanning operation.

It is to be noted that in the case of gradual deterioration, the computer continues to function normally during the monitoring operation and after the existence of a deviation has been indicated. Thereafter, during the normal computer maintenance period, the fault is rectified and the relay 38 is reset.

Continuous monitoring system

In some computer systems it may be desirable to continue the scanning of the examined points during the entire computation period in order to detect additional pulse deviations if they occur.

Continuous monitoring, after an initial pulse deviation has been registered, may be obtained by using another embodiment of the invention which will be described by specifying minor modifications of the embodiment shown in Figure 1.

The following changes are made: Connection 11 from the switch drive 8 is coupled directly to the positive terminal of power supply 12, and the relay 38 is not required (the contacts 42 are disconnected from the switch member 15); the alarm 43 is disconnected from switch member 15; the error indicating lamps 44 are replaced by indicating devices which will maintain a particular state after operation, for example, annunciators; the output connection 37 of the electronic switch 40 (which will be described more fully below) is connected directly to the switch member 15 of the switch 6; the remaining terminals of the annunciators are connected to a voltage source, say one hundred fifty volts.

When a pulse deviation occurs a signal is produced by the comparator 32 which operates the electronic switch 40. When the electronic switch 40 is energized, current flows through the connection 37 and through the annunciator associated with the examined point, to operate the annunciator. When the switch member 15 moves to the next position, the current flow is interrupted resetting the electronic switch 40. The system is now capable of indicating pulse deviations which may occur at other examined points. The annunciators are reset during the next maintenance period after the computer is repaired.

Thus the invention provides for automatic operation of a pulse monitoring system and indicates the exact location of pulse deviations, and does this without interfering with the normal operation of the computer. In addition, there is no erroneous indication due to random noise or the legitimate absence of a pulse at the examined point. Further, continuous monitoring in order to detect additional pulse deviations is easily achieved.

*Description of amplifier 30, comparator 32, and electronic switch 40*

Referring again to Figure 1, the amplifier 30 comprises a linear amplifier 46 and a cathode follower 48. The linear amplifier 46 includes the vacuum tube or electronic discharge device 50 having an anode 52, a control element or grid 54 and a cathode 56. The grid 54 is coupled directly to switch member 14 of switch 2. The anode 52 is connected to a suitable voltage source 60, say one hundred fifty volts, by the resistor 64. The cathode resistor 62 connects the cathode 56 to ground and functions to bias the vacuum tube 50 and to provide degeneration. Degeneration occurs as the tube ages and the cathode emission drops, the corresponding drop in current decreases the tube operating bias to neutralize the change in gain to a substantial extent.

The linear amplifier 46 is coupled to the cathode follower 48 by means of a tapped resistor 65 connected between the anode 52 of the vacuum tube 50 and the displacement voltage source 63 of minus one hundred and fifty volts. The cathode follower comprises the vacuum tube 67 having an anode 68, a control grid 69, and cathode 70. The anode 68 is connected to the voltage source 60 by a resistor 71. The grid 69 is connected to the tap 66 on the resistor 65. The cathode 70 is grounded by means of the resistor 72 which provides bias and degeneration for the vacuum tube 67.

The vacuum tube 50 is adjusted to operate as a linear amplifier by suitable choice of circuit constants. The circuit constants of vacuum tubes 50 and 67, the position of tap 66 and the magnitude of the voltage source 63 are chosen so that the examined pulse P is amplified and displaced to appear as pulse A (see line A) at the cathode 70 of the tube 67 having a shape substantially similar to the examined pulse but of a negative polarity and of twice the amplitude of the examined pulse.

The amplifier 30 is coupled to the comparator 32 by means of the first input line 33 which is connected to the junction point A of resistors 74 and 75 in series. The other end of resistor 74 is connected to the anode 76 of the diode rectifier 78.

The junction point B of the diode 78 and the resistor 74 is connected to the standard pulse generator 34 via the resistor 73 and the second input line 35. More particularly, line 35 is connected to switch member 80 of the switch 4. The resistors 73 and 74 are preferably chosen to be of equal resistance for reasons which will appear below. The cathode 82 of the diode 78 is connected to ground via the resistor 96 and is coupled by means of the capacitor 84 to the vacuum tube or electron discharge device 86.

Vacuum tube 86 comprises the anode 88, the control grid 92, and the cathode 94 which is grounded. The capacitor 84 is coupled directly to the control grid 92 which is connected to a suitable negative bias source 100, say minus five volts, by means of the resistor 98. The anode 88 is coupled to a positive voltage source 105, which may be one hundred fifty volts, by means of the primary winding 132 of the pulse transformer 130.

The pulse transformer 130 comprises the primary winding 132 and the secondary winding 134. One terminal of the secondary winding 134 is connected to a negative voltage source 135, say minus ten volts. The other terminal of the secondary winding 134 is connected to the anode 136 of the diode 138. The cathode 140 of the diode 138 is connected to a negative voltage source 142, say minus sixty volts, by resistor 144, and to a negative voltage source 143, say minus eight volts, by the diode 102. The cathode 103 of the diode 102 and the cathode 140 of the diode 138 are connected together.

The cathode 103 of the diode 102 is also connected to a first control grid 152 of an electron discharge device or vacuum tube 150. Vacuum tube 150, which functions as a gating device, includes an anode 154, a screen grid 156, a second control grid 158 and a cathode 160. The second control grid 158 is connected to the pulse generator 34 via the second input line 35 and the switch 4. The screen grid 156 is connected to a suitable voltage source 162, say seventy-five volts. The cathode 160 is grounded. The anode 154 is connected to a suitable voltage source 164, say one hundred fifty volts, by means of the primary winding 166 of the pulse transformer 168. The secondary winding 170 of the pulse transformer 168 has one terminal connected to a negative voltage source 172, say minus ten volts, and the other terminal connected to the first control grid 152 of the vacuum tube 150 by means of the diode 174. The anode 176 of the diode 174 is connected to the secondary winding 170 and the cathode 178 of the diode 174 is connected to the control grid 152. Vacuum tube 150, diodes 174 and 138 and transformer 168, in combination, act as a pulse extender or standardizing device.

Referring again to junction or point A, the remaining end of resistor 75 is connected to the cathode 104 of the diode rectifier 105. The anode 106 of the diode 105 is coupled to the control grid 114 of the vacuum tube or electronic discharge device 110 by means of the capacitor 108. The vacuum tube 110 includes the anode 111 and the cathode 116.

The resistor 118, preferably of a resistance equal to that of resistor 75, joins the anode 106 of the diode 105 to a threshold voltage source 119 of minus six volts. The resistor 120 connects the control grid 114 to a suitable negative source 122, of say minus five volts. The cathode 116 of the tube 110 is connected to ground. The anode 111 is coupled to a positive voltage source 125, say one hundred and fifty volts, by means of the primary winding 182 of the pulse transformer 180.

The pulse transformer 180 comprises the primary winding 182, and the secondary winding 184. One terminal of the secondary winding 184 is connected to a negative voltage source 186, say minus ten volts. The other terminal is connected to a first control grid 190 of the electron discharge device or vacuum tube 192 through the diode rectifier 202.

The vacuum tube 192, which functions as a gating device, includes the anode 194, the screen grid 196, a second control grid 198 and the cathode 200. The first control grid 190 is connected to the cathode 204 of the diode 202. The resistor 208 links the cathode 204 of the diode 202 to a negative voltage source 210, say minus sixty volts. The cathode 204 is also connected to a negative voltage source 211, say minus eight volts, by the diode 124. The cathode 125 of the diode 124 and the cathode 204 of the diode 202 are connected together.

The anode 206 of the diode 202 is connected to the winding 184. The second control grid 198 is connected to the pulse generator 34 via the switch member 80 of the switch 4. The screen grid 196 of the tube 192 is connected to a suitable positive voltage source 212, say plus seventy-five volts. The cathode 200 is grounded. The anode 194 is connected to the positive voltage source 214, of about one hundred and fifty volts, by means of the primary winding 216 of the pulse transformer 218. The secondary winding 220 of the transformer 218 connects a negative voltage source 222, minus ten volts, to the control grid 190 by means of the diode rectifier 224. The diode rectifier 224 comprises the anode 226 connected to the winding 220, and the cathode 228 connected to the control grid 190. Tube 192, diodes 224 and 202 and transformer 218, in combination, act as a pulse extender or standardizing device. Vacuum tubes 150 and 192 are transformer coupled to the electronic discharge device or vacuum tube 230, which functions as an electronic gate, by means of the transformers 168 and 218, respectively.

The gating tube 230 includes a first control grid 232 and a second control grid 234. Control grid 232 is connected to the junction point E between the anode 176 of the diode 174 and the secondary winding 170 of the pulse transformer 168. Control grid 234 is connected to the junction point F between the anode 226 of the diode 224 and the secondary winding 220 of the transformer 218.

The vacuum tube 230 also includes an anode 236, a screen grid 238 and a cathode 240. The anode 236 is connected to a suitable voltage source 242, say one hundred and fifty volts, by means of the secondary winding 244 of the output transformer 246. The screen grid 238 is connected to a voltage source 250 of about seventy-five volts. The cathode 240 is grounded.

The output transformer 246 includes the secondary winding 248 having one terminal connected to a negative voltage source 252 of approximately minus ten volts. The other terminal of the secondary winding 248 is coupled to the electronic switch 40 by means of the output connection 41.

The diodes are preferably of the germanium crystal type, but each may be any unilateral conducting device. The purpose of the diodes 136, 174, 202 and 224 is to isolate the associated transformers from each other.

The electronic switch 40 is more accurately described as a trigger circuit of the gaseous tube type. The electronic switch 40 comprises an electronic discharge device or thyratron 260 having an anode 262, a control grid 264 and a cathode 265. The anode 262 is connected to a suitable voltage source 270, say one hundred and ten volts, by means of relay 38. The cathode 265 is grounded via the normally conducting reset switch 266. The control grid 264 is connected to the other terminal of the secondary winding 248 of the output transformer 246. The thyratron 260 will conduct when the grid 264 becomes positive with respect to the cathode 265 ionizing the enclosed gas. When the thyratron 260 conducts, the anode current passing through the relay 38 will cause the relay 38 to energize to indicate a pulse deviation as explained above. The thyratron 260 will remain conductive until reset.

The switch 40 and the relay 38 may be reset by momentarily opening the reset switch 226. This interrupts the flow of anode current, de-energizing the relay 38 and causing the gas in the tube 260 to de-ionize. The thyratron 260 will not conduct thereafter until another positive pulse appears at the control grid 264 to fire the thyratron 260.

*Detailed operation of the comparator 32*

Referring to Figures 1 and 4, assume that a pulse deviation indication is not desired when the examined pulse P (on line P) is of proper magnitude, and is properly shaped and positioned. Assume further that pulse R (on line R) having a magnitude of twelve volts, represents the limiting pulse such that it is desired to detect any poorer pulse.

The upper level comparison section of the comparator (comprising the diode 78, the vacuum tube 86, and the transformer 130) determines whether the examined pulse is of deteriorated shape, deteriorated magnitude, or is displaced position. If any of these conditions exist, a pulse E (on line E) will appear at point E, the control grid 232 of the gating tube 230, as will be hereinafter explained.

The signal representing the examined pulse is amplified and appears at point A as the negative pulse A (on line A) having twice the amplitude of the examined pulse. The voltage at point B is the average of the voltage at point A and the voltage at point S since the resistors 73 and 74 are preferably chosen to be equal. However, any resistance ratio may be used with corresponding changes in the circuitry. The pulse B (on line B) which appears at point B, therefore, is equal to the difference between pulses R and P because the amplified standard pulse S (on line S) is of the same shape and twice the amplitude of pulse R.

The pulse C (on line C) which appears at point C is the positive portion of the pulse B since the cathode 82 of the diode 78 is at ground potential and will only conduct when the anode 76 becomes positive. The pulse C is amplified and inverted by amplifier tube 86 and re-inverted by the transformer 130 to appear as pulse H (on line H) at junction point H of the anode 138 and the transformer secondary 134.

For purposes of description assume that the amplification of the amplifier and the turns ratio of the transformer 130 are chosen to result in a pulse H of positive polarity having ten times the magnitude of pulse C. Assume further that the pulse H will have a maximum amplitude of ten volts due to the saturation of amplifier tube 86. The diodes 138 and 174 are normally nonconducting between pulses since their anodes are at a lower potential than their cathodes because diode 102 is normally conducting and resistor 144 is chosen to have a relatively high resistance. When a pulse H greater than two volts is present, diodes 138 and 174 conduct and diode 102 is disconnected.

The vacuum tube 150 is adjusted so that it will conduct when both control grids 152 and 158 are driven positive. Since control grid 158 is connected to the pulse generator, an output pulse will be produced when the amplified pulse S and pulse H exist simultaneously.

The pulse H is stretched or standardized in the following manner: when an output pulse is initiated, it is inverted by the transformer 168 and appears across the secondary 170 and is fed back to the control grid 152 by means of the diode 174. This maintains the positive signal on the control grid 152 until the standard pulse on control grid 158 terminates. When the amplified standard pulse terminates, the tube 150 does not conduct. In other words, if the pulse H terminates before the amplified standard pulse E terminates, the pulse output is maintained until the end of the amplified standard pulse and appears as a positive pulse E (on line E) at point E. Between pulses, undesired feedback and therefore unwanted oscillation is prevented since the diode 174 becomes nonconducting due to the diode 102 and the source 143.

Referring again to point A, the lower level comparison section (comprising the diode 105, the amplifier tube 110 and the transformer 130) operates to impress a pulse at point F (the control grid 234 of the gating tube 230) whenever the examined pulse P exceeds a magnitude of three volts, as will be explained hereinafter.

The voltage at point D will equal the average of the voltages appearing at point A diminished by six volts. This is because resistors 75 and 118 are preferably chosen to be equal. However, any resistance ratio may be used with corresponding changes in the circuitry. Point D will be maintained at a base level of minus six volts between pulses since the anode 106 is more negative than the cathode 104. When a pulse A appears at point A, the diode 105 will not conduct until the magnitude of the pulse becomes less than minus six volts. The averaging of the voltages occurs whenever the diode 105 conducts and a pulse D (on line D) of negative polarity is produced at point D. Pulse D is amplified by the amplifier tube 110 and appears as pulse I (on line I) at point I having positive polarity due to the inversion caused by the amplifier.

For purposes of description assume that the amplification of the amplifier tube 110 and the turns ratio of the transformer 130 are chosen to result in a pulse I having ten times the magnitude of pulse D, with a maximum amplitude of ten volts due to the saturation of tube 110. The vacuum tube 192 and the associated components function in a similar manner as the vacuum tube 150 circuitry, that is, it stretches and standardizes the input pulses. When an amplified standard pulse S and a pulse I initially exists simultaneously, an output signal will be maintained until the termination of the amplified standard pulse S. The output pulse F (on line F) appears at point F, that is, the control grid 234 of the gating tube 230.

The gating tube 230 will conduct when positive signals appear simultaneously on the control grids 232 and 234. This will be the case when an examined pulse is greater than three volts and is either poorly shaped, or less than twelve volts, or is displaced. An output pulse G (on line G) from gating tube 230 will fire the thyratron tube 260 to indicate a pulse deviation.

Of course, the invention is not restricted to the types of amplifiers, pulse standardizers, rectifiers, or gating circuits shown, and similar components may be substituted.

The operation of the comparator 32 will be explained in more detail in connection with the series of examined pulses P1 . . . P9 as described above and as shown in Figure 4. The wave forms directly beneath the respective P pulses indicate the pulse shapes at the respective points in the system which occur when the indicated P pulse is examined.

P1, a pulse of excellent shape and magnitude, is amplified and inverted by the amplifier 30 and appears at point A as indicated by pulse A1. Pulse B1 indicates the pulse shape at point B. Since B1 is entirely negative, no pulse will appear at point C and consequently the upper section will not impress a pulse on the grid 232 of the gating tube 230, thus preventing a pulse deviation indication.

Pulse P2, a poorly shaped pulse, will appear as pulse A2 at point A. Pulse B2 indicates the averaging of the pulse A and the pulse S. The pulse E2 will appear at point E because a portion of pulse B is positive as indicated by pulse C2. Since pulse P2 is greater than three volts, a pulse F2 will appear at point F simultaneously, resulting in a pulse deviation indication produced by the output pulse G2 which fires the thyratron 260 to operate the electronic switch 40.

Pulse P3, a pulse of marginal shape and magnitude will similarly produce a pulse E3 at the gating tube simultaneously with the pulse F3, since the examined pulse has a magnitude greater than three volts. The consequent output pulse G3 will indicate a pulse deviation.

Although the pulse deterioration will normally occur in a predictable manner, it is possible that a sudden change of shape may take place producing a pulse of the P4 type. Pulse P4 is a poorly shaped pulse having an unacceptable magnitude, that is, a magnitude greater than three volts and less than twelve volts. When an examined pulse in the shape of pulse P4 occurs, a pulse C4 will appear at point C since a portion of pulse B4 is positive. The pulse C4 will be amplified and standardized to appear as pulse E4 at the control grid 232 of the output gating tube 230. A pulse will also appear at the control grid 234 since the amplitude of pulse P4 is greater than three volts. The resulting pulse G4 will indicate a pulse deviation.

Pulses of the type P5 may also occasionally occur having a magnitude a little greater than the lower threshold level of three volts; for example, four volts. In this case particularly, the pulse standardizing circuits substantially help to provide a more accurate pulse detection system. This is because the pulse produced at the point I is relatively narrow since only a small portion of the pulse P5 is above the three-volt level. The pulse I5 appears at the gating tube 230 simultaneously with the pulse F5 which is generated due to the fact that the magnitude of pulse P5 is less than twelve volts. It should be noted that if the pulses at points H and I were applied directly to the output gating tube 230, they might not occur simultaneously and thus not produce an output pulse to fire the thyratron tube 260. The pulse stretching produced by the pulse standardizing tube 192 results in pulses which last until the end of the corresponding pulse S and hence coexist at the end of that period.

Pulse P6 illustrates the operation of the comparator in the presence of signals having magnitudes of less than three volts, for example, random noise. No pulse is produced at point D and therefore a pulse will not appear at point F, thus preventing the occurrence of a pulse deviation indication.

The position P7 on the line P indicates the operation of the comparator when a pulse is legitimately absent at an examined point in the computer. The comparator functions in exactly the same manner as in the case of the pulse P6 and no signal will appear at the output of the comparator.

Pulse P8 is a pulse of proper shape and amplitude but occurs too early; in other words, it is displaced in position. Since the standard pulses are properly timed, when the comparison is made between the pulse A and the pulse S, the two pulses will coexist for only a small period of time resulting in relatively narrow pulses at points C, H and E. Since the pulse P8 has a magnitude greater than three volts, pulse F8 will appear at point F simultaneously with the pulse E8 to produce an error indicating pulse G8.

Pulse P9 illustrates an examined pulse which occurs too late. In this case, the relatively narrow pulse H9 produced at point H is stretched to produce the pulse E9 at the gating tube 230 simultaneously with the pulse F9 to indicate a pulse deviation. Therefore, when the pulse is too late, the pulse stretching produced by the pulse standardizing tube 150 functions to reduce the margin of error of the comparator.

It should be noted that the standard pulses are considerably narrower than the examined pulses. This is to allow the examined pulse to rise to a point near its maximum magnitude before it is compared, otherwise a false error might be indicated during the transient periods between the maximum amplitude and the base voltage.

For purposes of description the pulses are shown in theoretically correct form. In actual operation, however, the pulses are more rounded than illustrated, but this does not affect the proper operation of the invention.

Similarly, the pulses are shown in a number of discrete stages of possible deterioration although in practice the shapes normally would vary continuously from one stage to another. Also, different types of circuit deterioration will produce various kinds of pulses, and only a portion of the pulse shapes shown will appear at a particular point.

In summary, an output pulse will appear at the output of the comparator, and thus indicate a danger point, only when the following examined pulse conditions appear simultaneously:

1. The examined pulse has a instantaneous amplitude which is less than the instantaneous amplitude of the standard pulse R.

2. The examined pulse has a maximum amplitude greater than three volts.

The existence of the first condition indicates a deviation in pulse shape or magnitude, or a displacement in pulse position. The second condition insures that false danger signals will not occur when pulses are legitimately absent or when random noise is present at the examined point.

*Comparator 32'*

Figure 2:
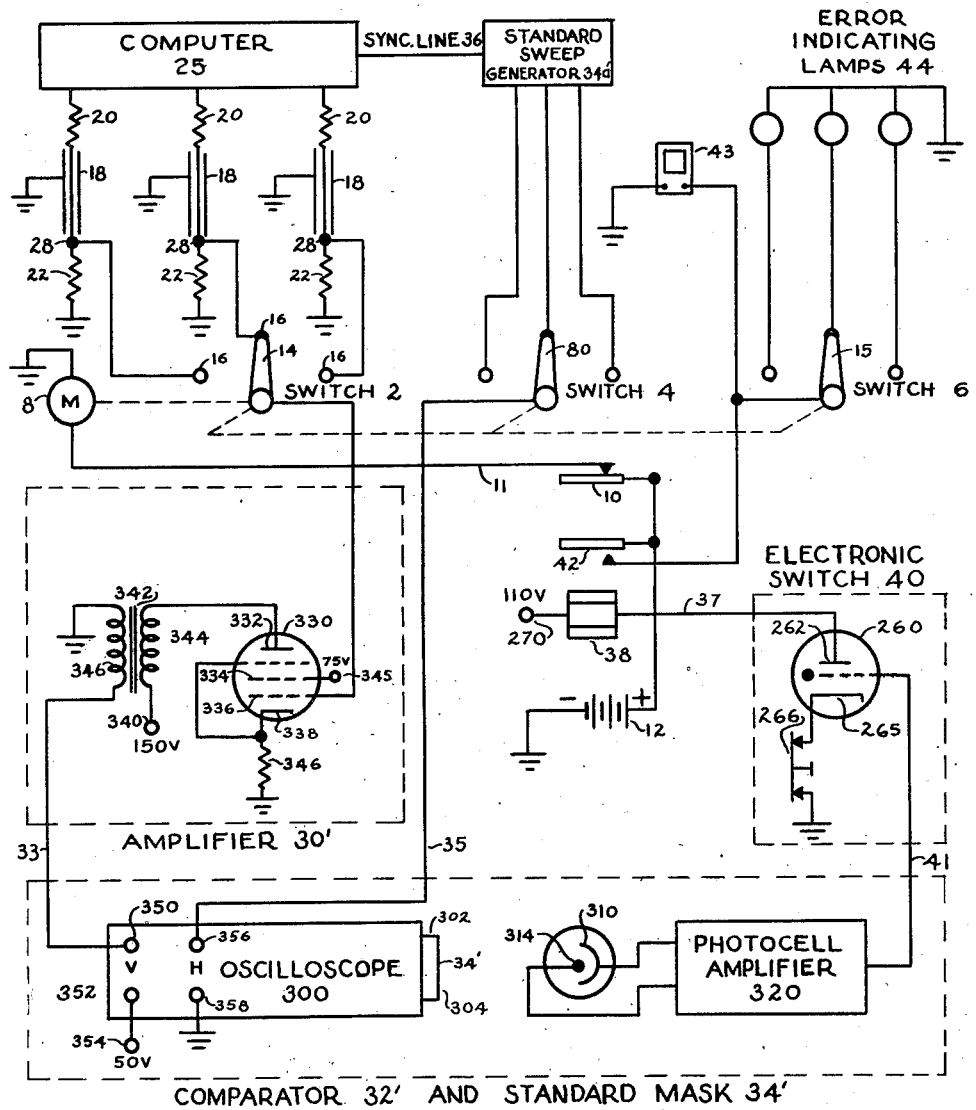
Figure 2 shows another embodiment of the invention.

Another embodiment of the invention is diagrammatically illustrated in Figure 2. The same elements are designated by the same reference characters as in Figure 1, while equivalent elements bear prime designations (amplifier 30', comparator 32', standard mask 34' and standard sweep generator 34a'). This embodiment of the invention functions in exactly the same way as the system explained above, the fundamental difference being in the method of comparison. The standard mask 34' and the standard sweep generator 34a' cooperate to provide a standard of comparison.

The comparator 32' and standard mask 34' comprise an oscilloscope 300, a standard mask 34', a photoelectric cell 310, and a photocell amplifier 320.

Figure 3:
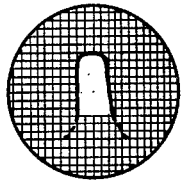
Figure 3 illustrates a feature of the comparator shown in Figure 2.

Oscilloscopes are instruments which are commercially well known, such as the General Electric Oscilloscope, Type ST-2A. The oscilloscope 300 has a cathode ray tube 302 with a standard mask 34' which partially masks the screen 304 of the cathode ray tube 302, as shown in Figure 3. The unmasked portion corresponds to the limiting pulse R (see Figure 4, line R) except that the area below a magnitude of three volts is masked by the standard mask 34'.

The examined pulse is amplified by the amplifier 30' which includes the vacuum tube 330 having an anode 332, a screen grid 334, a control grid 336 and a cathode 338. The anode 332 is connected to a suitable voltage source 340, say one hundred fifty volts, by the primary winding 344 of the transformer 342. One terminal of the secondary winding 346 is grounded and the other is connected to the input line 33. The screen grid 334 is connected to a suitable voltage source 345, say seventy-five volts. The control grid 336 is coupled to the examined points in the computer 25 by means of switch 2. The cathode 338 is connected to ground via the cathode resistor 346 which provides bias and degeneration. The amplifier 30' is adjusted to operate linearly and to deliver a positive output.

The amplified signal is fed to the comparator 32' by the input line 33 which connects the vertical plate terminal 350 of the oscilloscope 300 to the anode 332. The other vertical plate terminal 352 is connected to a suitable voltage source 354, say fifty volts.

The horizontal plate terminal 356 is connected by means of the second input line 35 to the switch 4 which selects different sweep frequencies from the standard sweep generator 34a' depending on the characteristics of the examined pulse at a particular point in the computer 25 circuitry. The remaining horizontal plate terminal 358 is grounded.

Any generator capable of producing periodic waves is suitable for use as the sweep generator. Sweep generators are commercially available and may be of the type generally used in oscilloscope design. Since more than one standard sweep frequency is required, a corresponding number of sweep generators is necessary. Therefore, the sweep generator 34a' is actually composed of a number of separate generators although shown as one for purposes of description.

The amplification of amplifier 30' and the magnitude of the voltage source 354 are chosen so that the examined pulse will appear properly displayed on the screen 304 of the oscilloscope 300. If any portion of the displayed pulse appears in the unmasked portion of the screen 304, indicating a pulse deviation as explained above, the light is picked up by the photoelectric cell 310 which is positioned in front of the screen. The screen 304, the standard mask 34', and the cell 310 are enclosed in a lightproof structure (not shown). The photocell 310 is connected to the amplifier 320.

When a pulse deviation occurs, the photocell 310 converts the light appearing as a trace on the unmasked portion of the screen 304 into an electric current which is amplified by the photocell amplifier 320. The photocell amplifier 320 is substantially the same as amplifier 30' although it may be any amplifier circuit. The output line 322 of the comparator is connected between the transformer (not shown) of the amplifier 320 and the control grid 264 of the electronic switch 40. The amplified signal which appears on the output line 322 when a pulse deviation occurs, operates the electronic switch 40, as explained above, to indicate a pulse deviation.

*Conclusion*

Thus the invention provides an improved method of automatically monitoring the shape, amplitude and position of pulse type signals, and can detect dangerous deviations during the normal operation of the monitored device before the deviations become serious enough to result in error production.

In addition, no error indication will be produced in the presence of random noise or when an examined pulse is legitimately absent.

In order to simplify the explanation of the invention, all potential sources used throughout this system have been indicated by their individual magnitudes and polarities. Also, pulse shapes and magnitudes have been indicated as having particular values. It will be understood, of course, that these magnitudes and polarities are not critical and the invention is not so limited; the particular values are given by way of illustration only. Also, the power supplies and heaters which may be utilized for bringing the thermionic cathodes to operating temperature have not been discussed since these elements are well known to those skilled in the art.

While only a representative embodiment of the invention disclosed herein has been outlined in detail, there will be obvious to those skilled in the art, many modifications and variations accomplishing the foregoing objects and realizing many or all of the advantages, but which yet do not depart essentially from the spirit of the invention.

What is claimed is:

1. A comparator for comparing an examined pulse with a standard pulse of a given shape, magnitude and position, and with a lower level threshold voltage having a magnitude greater than the random noise voltage comprising: an upper level comparison means having a first input connection, a second input connection, and an output connection, said first input connection being responsive to the examined pulse, said second input connection being responsive to the standard pulse, an output signal appearing at said output connection when the instantaneous magnitude of the examined pulse falls below the instantaneous magnitude of the standard pulse; a lower level comparison means having a first input connection, a second input connection and an output connection, said first input connection of the lower level comparison means being responsive to the examined pulse, said second input connection of the lower level comparison means being responsive to the threshold voltage; the presence of a signal on said output connection of the lower level comparison means indicating a signal having a magnitude greater than the magnitude of the threshold voltage, the simultaneous appearance of signals on said output connections indicating a deviation in shape or magnitude or position of the examined pulse; and gating means having first and second input connections and an output connection, said first input connection of the gating means being connected to said output connection of the upper level comparison means, said second input connection of the gating means being connected to said output connection of the lower level comparison means; a signal indicating a pulse deviation appearing at said output connection of said gating means when signals are present simultaneously at said first and second input connections of said gating means.

2. A comparator for comparing an examined pulse with a standard pulse of a given shape, magnitude and position, and with a given lower level threshold voltage having a magnitude greater than the random noise voltage level comprising: an upper level comparison means having a first input connection, a second input connection, and an output connection, said first input connection being responsive to the examined pulse, said second input connection being responsive to the standard pulse, an output signal appearing at said output connection when the instantaneous magnitude of the examined pulse falls below the instantaneous magnitude of the standard pulse; a lower level comparison means having a first input connection, a second input connection and an output connection, said first input connection of the lower lever comparison means being responsive to the examined pulse, said second input connection of the said lower level comparison means being responsive to the threshold voltage; the presence of a signal on said output connection of the lower level comparison means indicating a signal having a magnitude greater than the magnitude of the threshold voltage; first pulse standardizing means having an input connection connected to said output connection of the upper level comparison means and an output connection; second pulse standardizing means having an input connection connected to said output connection of the lower level comparison means and an output connection; the simultaneous appearance of signals on said first and second standardizing means output connections indicating a deviation in shape or magnitude or position of the examined pulse examined point; no pulse deviation being indicated when random noise is present at said first input connections, no pulse deviation being indicated when a pulse is absent at said first input connections.

3. A comparator for comparing an examined pulse with a standard pulse of a given shape, magnitude and position, and with a given lower level threshold voltage having a magnitude greater than the random noise voltage level comprising: an upper level comparison means having a first input connection, a second input connection, and an output connection, said first input connection being responsive to the examined pulse, said second input connection being responsive to the standard pulse, an output signal appearing at said output connection when the instantaneous magnitude of the examined pulse falls below the instataneous magnitude of the standard pulse; a lower level comparison means having a first input connection, a second input connection and an output connection, said first input connection of the lower level comparison means being responsive to the examined pulse, said second input connection of the lower level comparison means being responsive to the threshold voltage; the presence of a signal on said output connection of the lower level comparison means indicating a signal having a magnitude greater than the magnitude of the threshold voltage; first pulse standardizing means having an input connection connected to said output connection of the upper level comparison means and an output connection; second pulse standardizing means having an input connection connected to said output connection of the lower level comparison means and an output connection; the simultaneous appearance of signals on said first and second standardizing means output connections indicating a deviation in shape or magnitude or position of the examined pulse; no pulse deviation being indicated when random noise is present at said first input connections, no pulse deviation being indicated when a pulse is absent at said first input connections; said first and second pulse standardizing means reducing the margin of pulse deviation indication error; and gating means having first and second input connections and an output connection, said first input connection of the gating means being connected to said output connection of the first standardizing means, said second input connection of the gating means being connected to said output connection of the second standardizing means, a signal indicating a pulse deviation appearing at said output connection of the gating means when signals are present simultaneously at the said first and second input connections of said gating means.

4. A comparator for comparing an examined pulse with a standard pulse of a given shape, magnitude, and position comprising a first resistor having one end responsive to the examined pulse, a second resistor having one end responsive to the standard pulse, a unilateral conductor having one end of predetermined polarity connected to the other ends of said resistors, a third resistor connecting the other end of said unilateral conductor to a point of fixed reference potential, the appearance of a pulse on said other end of the unilateral conductor indicating a deviation in shape or magnitude or position of the examined pulse; and pulse standardizing means having a first control element, a second control element and a controlled element, said first control element being connected to said other end of the unilateral conductor, said second control element being responsive to the standard pulse, and feedback means connecting said controlled element to said first control element; an output pulse initially appearing at said controlled element when the pulse indicating a pulse deviation and the standard pulse exist simultaneously, the output pulse being maintained until the termination of the standard pulse.

5. A comparator for comparing an examined pulse with a lower level threshold voltage having a magnitude proportional to the random noise voltage level comprising a first resistor having one end responsive to the examined pulse, a unilateral conductor having one end of predetermined polarity connected to the other end of said first resistor, a second resistor having one end connected to the other end of said unilateral conductor, the other end of said second resistor being responsive to the threshold voltage, the presence of random noise at said first resistor not resulting in a signal across said second resistor, a standard pulse source, and pulse standardizing means having a first control element, a second control element and a controlled element, said first control element being connected to said other end of the unilateral conductor, said second control element being connected to said standard pulse source, feedback means connecting said controlled element to said first control element; an output pulse initially appearing at said controlled element when the pulse indicating a pulse deviation and the standard pulse exist simultaneously, the output pulse being maintained until the termination of the standard pulse.

6. A comparator for comparing an examined pulse with a standard pulse of a given shape, magnitude, and position and with a standard voltage having a magnitude proportional to the signal level of random noise comprising: a first impeder having one end responsive to the examined pulse, a second impeder having one end responsive to the standard pulse, a first unilateral conductor having one end of predetermined polarity connected to the other ends of said impeders, a third impeder connecting the other end of said first unilateral conductor to a point of fixed reference potential, the appearance of a signal on said other end of the first unilateral conductor indicating a deviation in shape or magnitude or position of the examined pulse; pulse standardizing means having one end connected to said other end of the first unilateral conductor; gating means having a first input, a second input and an output, the other end of said pulse standardizing means being connected to said first input of the gating means; a fourth impeder having one end responsive to the examined pulse, a second unilateral conducting device having one end of predetermined polarity connected to the other end of said fourth impeder; a fifth impeder having one end connected to the other end of said second unilateral conducting device, the other end of said fifth impeder being responsive to the standard voltage, the presence of random noise at said one end of said fourth impeder not resulting in a signal at said other end of the second unilateral conducting device; and pulse standardizing means having one end connected to said other end of the second unilateral conducting device, the other end of said pulse standardizing means being connected to said second input of the gating means; a signal appearing at the output of said gating means when an examined pulse has deviated in shape or magnitude or position as compared with the standard pulse, no signal appearing at said output when random noise is present in place of the examined pulse, no signal appearing at said output when an examined pulse is legitimately absent.

7. A comparator for comparing an examined pulse with a standard pulse of a given shape, magnitude, and position and with a standard voltage having a magnitude proportional to the signal level of random noise comprising: a first resistor having one end responsive to the examined pulse, a second resistor having one end responsive to the standard pulse, a first unilateral conductor having one end of predetermined polarity connected to the other ends of said resistors, a third resistor connecting the other end of said first unilateral conductor to a point of fixed reference potential, the appearance of a signal on said other end of the first unilateral conductor indicating a deviation in shape or magnitude or position of the examined pulse; first amplifier means having one end connected to said other end of the first unilateral conductor; first pulse standardizing means having one end connected to the other end of said first amplifier means; gating means having a first input, a second input and an output, the other end of said first pulse standardizing means being connected to said first input of the gating means; a fourth resistor having one end responsive to the examined pulse, a second unilateral conducting device having one end of predetermined polarity connected to the other end of said fourth resistor, a fifth resistor connected to the other end of said second unilateral conducting device, the other end of said fifth resistor being responsive to the standard voltage, the presence of random noise in place of an examined pulse not resulting in a signal at said other end of the second unilateral conducting device; second amplifier means having one end connected to said other end of the second unilateral conducting device; and second pulse standardizing means having one end connected to the other end of said second amplifier means, the other end of said second pulse standardizing means being connected to said second input of the gating means; a signal appearing at the output of said gating means when an examined pulse has deviated in shape or magnitude or position as compared with the standard pulse, no signal appearing at said output when random noise is present, no signal appearing at said output when an examined signal is legitimately absent.

References Cited in the file of this patent
UNITED STATES PATENTS

| | | |
|---|---|---|
| 2,208,349 | Ulbricht | July 16, 1940 |
| 2,236,015 | Sonnentag | Mar. 25, 1941 |
| 2,266,401 | Reeves | Dec. 16, 1941 |
| 2,504,976 | Grieg | Apr. 25, 1950 |
| 2,557,729 | Eckert | June 19, 1951 |
| 2,577,475 | Miller | Dec. 4, 1951 |
| 2,603,746 | Burkhart et al. | July 15, 1952 |
| 2,632,104 | Lakatos | Mar. 17, 1953 |
| 2,633,570 | Greenwood | Mar. 31, 1953 |
| 2,649,543 | Trachtenberg | Aug. 18, 1953 |
| 2,658,142 | St. John | Nov. 3, 1953 |
| 2,675,538 | Malthaner et al. | Apr. 13, 1954 |
| 2,676,253 | Ayres | Apr. 20, 1954 |
| 2,676,286 | Buchner | Apr. 20, 1954 |
| 2,677,758 | Robinson et al. | May 4, 1954 |
| 2,685,039 | Scarbrough et al. | July 27, 1954 |
| 2,693,907 | Tootill | Nov. 9, 1954 |